B. E. ELDRED & G. MERSEREAU.
PROCESS OF MAKING UNSATURATED HYDROCARBONS.
APPLICATION FILED AUG. 6, 1912.
1,234,886.
Patented July 31, 1917.
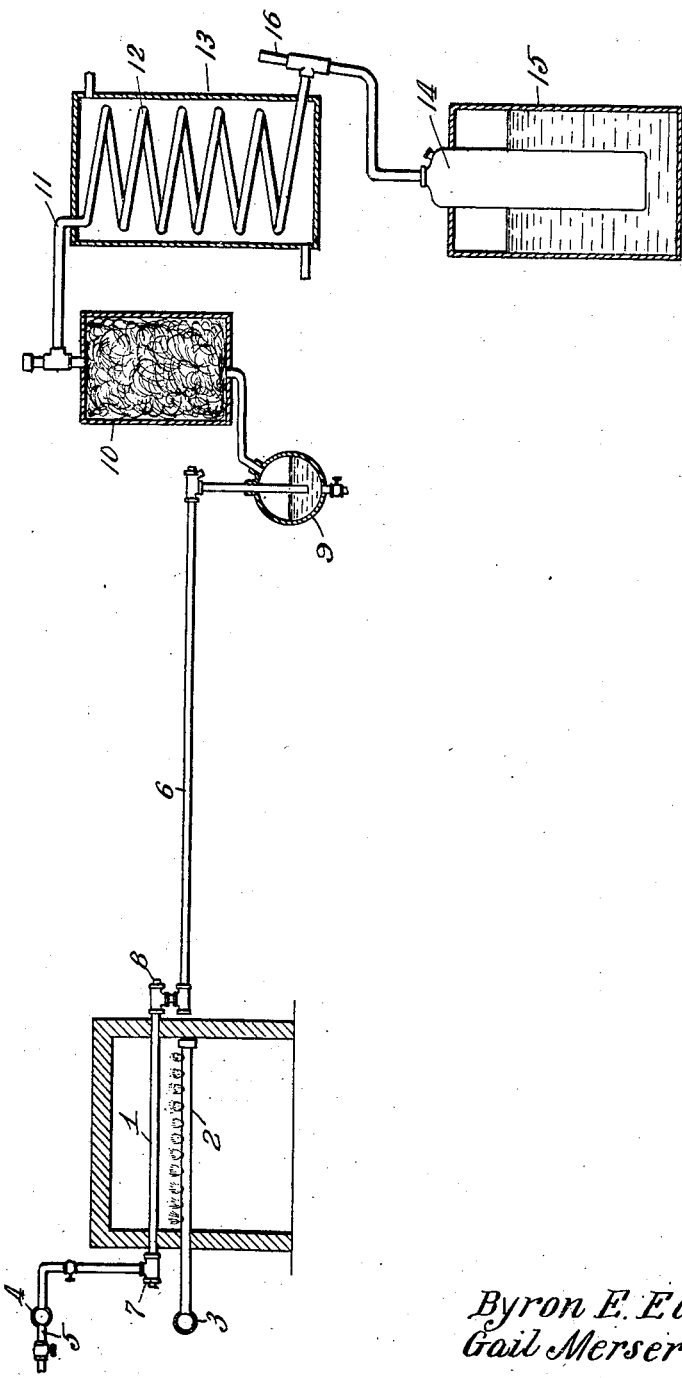
Witnesses
H. G. Johnette
H. Schoenthal.
Inventor
Byron E. Eldred
Gail Mersereau
By K. P. McElroy.
Attorney

UNITED STATES PATENT OFFICE.

BYRON E. ELDRED AND GAIL MERSEREAU, OF NEW YORK, N. Y., ASSIGNORS TO CHEMICAL DEVELOPMENT COMPANY, A CORPORATION OF MAINE.

PROCESS OF MAKING UNSATURATED HYDROCARBONS.

1,234,886.  Specification of Letters Patent.  Patented July 31, 1917.

Application filed August 6, 1912. Serial No. 713,585.

*To all whom it may concern:*

Be it known that we, BYRON E. ELDRED and GAIL MERSEREAU, citizens of the United States, residing at New York, in the county of New York and State of New York, have invented certain new and useful Improvements in Processes of Making Unsaturated Hydrocarbons, of which the following is a specification.

This invention relates to processes of making unsaturated hydrocarbons; and it comprises a method of depolymerizing high boiling oils, advantageously heavy petroleum oils or residua, to form unsaturated gaseous hydrocarbons of the aliphatic series wherein such oil in a vaporized state is subjected for a brief period of time to a low gasifying temperature, as by transmitting a current of such vapors past or over heated surfaces, the time of exposure of such oil to such temperature being insufficient to produce complete decomposition, the heated vapors and gases are removed from the zone of heat and quickly cooled to remove unchanged oil and the gases are thereafter subjected to treatment to recover or utilize the contained unsaturated gaseous hydrocarbons; all as more fully hereinafter set forth and as claimed.

Ethylene, propylene, the butylenes and the other gaseous compounds of this aliphatic group, being unsaturated hydrocarbons of comparatively high reactivity, are of great potential utility as raw materials for the manufacture of many chemical substances, but at present it is hardly practicable to utilize these hydrocarbons technically because of the cost of production. Ethylene, for example, is potentially valuable as a raw material for the manufacture of many substances, such as alcohol, ether, aldehyde, glycol, ethylene chlorhydrin, ethylene esters, vinyl derivatives, etc., but obviously it can hardly be contemplated for such uses if made from alcohol, its usual source. Propylene and the butylenes are also materials which can be used in producing many valuable substances; but are at present expensive to produce. The other unsaturated aliphatic hydrocarbons, as possible sources of synthetic caoutchouc, are attracting much attention; but the present methods for their production are all unduly expensive.

It is the object of the present invention to provide a simple, cheap and ready method of producing these useful unsaturated gaseous hydrocarbons from inexpensive raw materials. To this end, certain mineral oils are broken down under regulated conditions by exposure to a heat around 700° C. in such a manner as to depolymerize the same into gaseous hydrocarbons without deposition of tar or carbon.

On heating hydrocarbon oils to high temperatures, temperatures above a bright red heat, as is done in methods of making and "fixing" oil gas, the reactions taking place are many and of varied nature. Analytic and synthetic reactions take place simultaneously in a complicated way; but with sufficient time and temperature the results are approximately the same: the "fixed" gas contains much methane and hydrogen with minor proportions of other constituents. Tar (that is, bodies containing much carbon and little hydrogen) and coky carbon are always formed; and this coky carbon apparently plays much part, chemically and catalytically, in connection with the high temperature reactions. At temperatures above 1000° C., which are often attained in gas making and fixing operations, methane, hydrogen and coky carbon tend to come to an equilibrium; the coky carbon being, very probably, formed by dissociation of methane to form hydrogen—a reversible reaction. Most of the other hydrocarbons on dissociation tend to give soft forms of carbon analogous to soot or lampblack. The fixed gas always contains some ethylene, but the proportion rarely runs up over 4 or 5 per cent. At temperatures above 800° ethylene very rapidly dissociates down to a definite small "partial pressure"; and, as a matter of fact, under some conditions its dissociation begins as low as 400° C. The presence of coky carbon facilitates its dissociation at low temperatures; such carbon acting as a catalytic. The illuminating powers of the "fixed" oil gas are largely due to volatile bodies of the aromatic series, such as benzene, toluene, napthalene, etc., since these are more resistant to high temperatures than hydrocarbons of the aliphatic series.

We have found that by heating "heavy oils", that is oils which, like many crude petroleums and petroleum residua, consist largely of carbon compounds containing from 10 to 20 or more carbons in the molecule, with a suitable control of the conditions we can produce a breaking down or depolymerization of comparatively simple and regulable type and without complex side reactions. Under proper conditions the oil is broken down mainly into gaseous 2-carbon compounds without deposition of carbon or formation of tar.

The oils best adapted for the present purposes are crude petroleums composed mainly of oils boiling at temperatures from 150° to 200° C. and best mainly above 200° C. (that is, containing hydrocarbons with more than 10 carbons) or petroleum residua from the manufacture of gasolene and kerosene; that is petroleum which has been freed of low boiling constituents. The low boiling petroleum oils composed of hydrocarbons with 6 to 8 carbons in the molecule are less well suited.

On exposing these high-boiling hydrocarbons in vapor form to temperatures around 700° and within 50° to 75° on either side of that point, a regularly gasifying depolymerization sets in with the production of low-molecular gaseous hydrocarbons without any great amount of other synthetic or analytic side reactions as long as vapor of unchanged oil still remains in the sphere of action. Such vapor seems to have a shielding action on the products. With the disappearance of unchanged oil, decomposition of the products begins. Coky carbon should be absent since in its presence, probably because of a special catalytic power, the regularity of action disappears.

To obtain the desired regularity of operation in the operation, the time of exposure to the heat should be comparatively short, not over a few seconds, there should be sufficient contact of the vapors with the heated solid materials conveying the heat thereto, these materials should be of suitable character and the operation should be so conducted as to preserve at all times an excess of heavy oil vapors in the sphere of reaction; or, in other words, the reaction should not be pushed to a finish as regards the particular body of oil vapors under treatment. And this excess should be well distributed throughout the body of gas and vapors; there should be no stratification of the comparatively light gases free of the relatively heavy oil vapors. In the presence of this excess of oil vapor, the reactions go forward much more smoothly while the excess is not lost since it can be condensed out of the reaction products and then returned in admixture with the fresh oil to the reaction zone. With proper regulation of conditions no important amount of carbon will be set free; and such as may occur will be soft and in the nature of lampblack. If hard, coky carbon be once deposited in the reaction chamber by undue heating or otherwise it exercises, as stated, a detrimental catalytic effect, causing far-going cracking with formation of more hard carbon. Its presence should therefore be guarded against.

The heating is best done in a narrow externally heated tube; which may be of steel, iron, copper or clay. "Crucible mixture" tubes of clay mixed with graphitic carbon are less well suited for the present purposes. Ordinary heavy walled steel or cast iron piping is eminently suitable for the purposes of this invention. It may be heated by gas, fire or electrical heating, as long as the heating is uniform and controllable. It is best not much over 1.5 inch internal diameter and may well be only an inch or 0.5 inch in internal diameter. A quarter inch tube is useful in some cases. Other forms of containers than cylindrical tubes may be used but it is desirable not to have any portion of the heating chamber more than an inch away from the wall. This is for a number of reasons. One is that capacity of a chamber increases faster than the area of the walls; and the larger a chamber the more heat units must be sent through a square inch of wall per second to maintain a given temperature throughout that chamber; i. e., the hotter must be the walls. And the figure given represents a convenient limit. In the present invention, while it is desired to heat the oil vapor and gas uniformly to some temperature around 700°, a temperature of 800° represents a danger limit which should not be exceeded. At 800° breaking down of ethylene, propylene, etc., is apt to begin under conditions here adopted. Another reason for the limit given is that with chambers of large section it is difficult to prevent stratification; a separation of oil vapors and gas. And a stratum of gas, substantially free of oil vapors, is apt to suffer damage at temperatures which would otherwise be safe.

In practice it is best to operate with narrow tubes. The length of these tubes may vary somewhat; but for the production of ethylene they are best comparatively short; the heated length may be from 6 to 30 inches. The linear area of the tube exposed to heating should be comparatively short; or in other words, merely enough to bring the vapors to the desired temperature without prolonging the heating action. Six to 10 inches of heated area with a tube of small diameter are sufficient; though the tube advantageously may be several times as long. With a half-inch iron tube, in producing ethylenic cracking, the tube may be so heated over about 6 inches of its length as to make it a just visible red and may have 18 to 30 inches of length beyond the heated area so arranged as to give a tolerable uniform temperature drop through such length down to about 150° C. Long narrow tubes; up to 90 inches in length may also be used;

but they give somewhat different results from the shorter tubes. The tubes are best straight as this facilitates cleaning and quick gas movement. Should coky carbon form within the tube the operation should be at once interrupted until it is removed since the tube will soon plug up and the quality of the gas will suffer at once. The tubes are best horizontally arranged as this facilitates quick travel of unstratified homogeneous currents of mixed vapor and gas therethrough.

It is best to supply the oil to the tube as liquid, flooding the feed end of the tube and allowing vaporization to take place inside rather than supply it as preformed vapor or as spray since this gives less stratification and affords more uniform action. The amount of feed should be so correlated to the size and the heated length of the tube and the temperature that a substantial amount of easily condensable heavy oil vapors will emerge with the effluent gaseous products of reaction. This amount with advantage is not less than 10 per cent. of the amount of oil fed in, and may be more, up to 35 to 50 per cent. With 10 per cent., in normal operation it may be said that often from a quarter to a half is cracked-down oily products and the residue is unchanged original oil; though these proportions will vary. In normal operation, the recovered oil is free of tar.

This excess of oil is readily recovered by air-cooling the gas exit conduit and may be returned to be mixed with fresh oil for re-passage. The excess of oil serves several important purposes. It acts to shield the unsaturated gases from breaking down, as a diluent to reduce the partial pressure of the ethylene, of the propylene, etc., and in its condensation to scrub the issuing gas, removing vapors of easily volatile oils which may be formed. Gas formed in a given tube at a given temperature, freed of the excess of oil and run back through the same tube at the same temperature (but in the absence of oil vapors) is apt to be damaged considerably.

The particular temperature to be used may vary somewhat; but should be around 700° C. in making ethylene as a principal product, not varying more than 50° to 75° either way. About 800° is, as stated, a danger limit. Operating with a ¾ inch tube having a heated length of about 30 inches, with an internal temperature of about 650°, the formation of gases is slow, though such gas as is formed is of good quality for the present purposes. With this heated length of tube at this temperature a considerable amount of cracked, low-boiling liquid bodies will be formed; and proportionately low gas. At 660° to 700° with a 30 inch tube, the conversion is good; at 750° it is quite rapid and care must be taken to insure quick passage of gas with short exposure to heat.

With a half-inch tube heated for 30 inches and with enough oil feed to give 10 to 50 per cent. condensable oil in the effluent product, the gas emerging will be white and foggy (from condensing oil). Any tinge of brown shows formation of tar and irregular operation. On air-cooling the effluent product, as by passing it through 8 or 9 feet of similar tubing, heavy oil will be condensed out and may be removed, carrying with it any gasolene-like hydrocarbons or other low-boiling liquid hydrocarbons. The gas will contain 45 to 50 per cent. olefins (mainly ethylene with a varying proportion of propylene and butylene), 4 to 5 per cent. of gaseous acetylenic hydrocarbons, 4 to 5 per cent. apparently other aliphatic unsaturated hydrocarbons and the residue mainly ethane with a little hydrogen. With a heated length of 90 inches in a quarter inch tube and an oil feed rapid enough to give substantial amounts of unchanged oil emerging, the proportion of propylene and butylene will be raised and that of ethylene lowered while the amount of the other unsaturated aliphatics will increase materially. With a tube of this length, the time of exposure of the oil to the heat will be about 5 seconds in normal operation.

The mixture of oil vapors and gases emerging should be cooled to condense out the heavy oil, and with it such light oils as may be present. With the type of oils best used in the present invention, air cooling is sufficient; but water cooling may be employed; and particularly with comparatively low temperature operation (say around 650°) where considerable proportions of "cracked" gasolenes may be formed. It may next be led through a filter to remove foggy particles of entrained oil.

After removing the heavy oil by cooling the gas may be purified if necessary. If made from oils containing aromatic constituents it may contain some benzene, toluene, etc., and in this event it is best scrubbed with wash oil to absorb and remove them. The condensing oil in cooling will of course take out some benzene; but as this oil is returned for re-passage the quantity of benzene increases until it appears in the gas. From the wash oil, benzene and toluene may be recovered by simple distillation. With crude oils consisting substantially of aliphatic hydrocarbons, aromatic hydrocarbons are not formed by the present treatment to any extent, the temperature being maintained at too low a point. If the original oil contained sulfur or nitrogen, appropriate purifying means should be applied to the gas.

The gas, after purification if necessary, may be treated in a number of ways for utilization. Its composition will vary somewhat with that of the original oil and with the details of operation. However, presuming a good petroleum with the vapors exposed to a temperature of about 660° to 700° for, say 2 seconds, as in running through a half-inch steel pipe heated for about 6 to 30 inches with 10 to 40 per cent. oil passing on beyond for condensation, the gas will usually run about 45 to 55 per cent. olefins, 4 or 5 per cent. acetylenic gases, 4 or 5 per cent. apparently other unsaturated aliphatics, a little hydrogen and methane and the residue mainly ethane. Of the olefins, two-thirds or more will be ethylene with the residue mainly propylene and a little butylene. If the time of exposure to heat be increased, as by running the oil through 80 to 90 inches of heated quarter inch tubing the said other aliphatics may go up to 8 or 9 per cent. and the proportion of propylene will also increase. This is possibly because of reaction between the olefins and the acetylenes; possibly because of reactions of these bodies with the decomposing oil.

The olefins and other unsaturated aliphatics may be absorbed and removed, allowing the ethane, methane and hydrogen to go forward to serve for combustion purposes. Or the ethane may be chlorinated or otherwise utilized. For example, the gas may be treated with chlorin, bromin, iodin, bleaching powder, etc., to produce condensable halids of the various olefins and diolefins, and these condensed or absorbed out to leave the ethane. With plenty of chlorin, the ethane may also be chlorinated; particularly in the presence of actinic light, as by doing the operation in the light of a mercury vapor lamp. This operation requires caution however since the reaction of the olefins and other unsaturated aliphatics with chlorin is violent. The condensed halid products may be readily separated from each other by fractional distillation. The gas may also be treated with sulfuric acid of appropriate strength and temperature to absorb both the olefins and the unsaturated aliphatics generally (as well as the acetylenes); or with a plurality of portions of such acid in such manner as to absorb first the said other aliphatics and acetylenes and then the olefins proper; in either case leaving the ethane to pass on for subsequent use. From the solutions so formed various useful products may be obtained. For example, the ethylene may be so converted into ethyl alcohol, the propylene into a propyl alcohol, etc. On passing the gas admixed with steam over various heated catalytics, such as alumina, alumina sulfate, thoria, etc., the same products may be obtained, ethane going forward for other uses as before. Admixing the gas with air or oxygen and passing over catalytics, such as platinum or palladium, various useful oxidized products may be obtained and condensed or absorbed, leaving the ethane. When chlorinated under circumstances allowing the interaction of water or steam, chlorhydrins are obtained. The gas may be usefully employed as an anodic depolarizer, as in electrolyzing brine.

In utilizing the olefins as just described, it is useful to remove and recover said certain unsaturated aliphatics preliminarily as these are valuable bodies. This may be done by simply chilling the gas to about 0° to —20° C. The chilled gas may be further washed with chilled oil to recover more diolefin.

In the accompanying illustration we have shown, more or less diagrammatically, an apparatus which may be used in the present process. In this showing, Element 1 is one of a bank of short narrow tubes mounted in parallel and heated by burner 2 supplied from main 3. These tubes may be about 30 inches long by an inch to 1.5 inches internal diameter and be made of heavy steel. At one end, the tube receives heavy oil from main 4, supplied from 5, and at the other it is connected with an air-cooled conduit 6. This conduit may be six to eight feet long. As shown, the tube is provided with caps 7 and 8 at each end by the removal of which it can be readily cleaned, as by thrusting a cleaning rod through. Means for cleaning are necessary since if coky carbon is once formed not only is the gas injured but the narrow tube usually promptly plugs up by the accumulation of such carbon. The presence of a little carbon in the condition of lampblack or soot does no harm, such carbon not having the detrimental catalytic effect of coky carbon. The air-cooled conduit communicates with an oil-main 9 where the oil condensed in air-cooling accumulates. It may be removed from time to time and returned to the oil feeding device. Beyond the oil main may be a scrubber, or other device, for removing any entrained oil. As shown, there is a purifier 10 containing excelsior or other fibrous material. Unless the oil contains sulfur, in which case suitable purifiers must be used, this simple device is all that is necessary. Gas leaves the purifier through conduit 11. If it be desirable as it generally is to chill it further to recover certain unsaturated aliphatics, the gas may pass through coil 12 in vessel 13 kept filled with chilled oil, calcium chlorid solution or other liquid capable of withstanding temperatures as low as 0° C. Condensed thereby these aliphatics flow down into receiver 14 which is shown as positioned in a cooling casing 15, kept filled with chilled oil, etc., while the gas flows to a place of use through conduit 16. This chilling is desirable since these unsaturated aliphatics are of commercial value and worth recovering and their removal by increasing the proportion of olefins, increases its value for the present purposes. Unless the original oil contained aromatic constituents, as is the case with some varieties of petroleum, the gas will not contain benzene, toluene, etc. If however aromatic constituents exist in the original oil there will be some benzene and toluene in the gas, and these if not otherwise removed are condensed with the other chilled condensate from which they may be separated by appropriate methods.

In the present embodiment of our invention we prefer to use for the heating means a simple unobstructed cylindrical tube and avoid the use of catalytics such as reduced nickel, copper, cobalt, etc., since any packing or other devices in the tube may lead to delay in the flow of portions of gas therethrough and, thereby, to damage in the ethylene. And in the presence of catalytics, as noted with regard to coky carbon, the action is apt to be other than the simple depolymerization here desired.

The gas making operation may be under the ordinary atmospheric pressure. Small changes in pressure, either to less or to greater pressure, do not much change the results.

Removal of the certain unsaturated aliphatics may be aided by the use of pressure or by the use of a little wash oil; from which they may be afterward distilled.

If desired, the propylene and butylene may then be recovered as such by compressing the chilled gas to say 100 to 120 pounds pressure. This will leave the ethylene and ethane in gas form and condense out propylene and butylene as liquids. It is not ordinarily worth while to condense the ethylene and ethane by great cold and high pressure and then fractionate since the ethylene is so easily absorbed and removed chemically or physically. By condensing out the propylene and butylene, substantially only ethylene is left admixed with the ethane and this mixture can be used to make pure ethylene products. Similarly, the propylene and butylene (which can be easily separated by fractionation) can be so used.

In most reactions however the various olefins give like products which can be easily separated from each other, as in the case of ethyl and propyl alcohol and it is simpler to treat the mixed gases rather than separate.

Where concentrated olefinic gas is desired this can be attained by physical, as distinguished from chemical absorption. Many oily bodies, such as oil of turpentine, certain petroleums of aromatic nature, tar oils, etc., have much more solvent power for olefins than for ethane; and by washing the gas with such oils, the olefins can be removed in solution, leaving the ethane to pass forward as gas. The charged oils can then be stripped of their olefins by heat or vacuum, or both.

In the case of some crude oils containing "colloidal carbon" or asphaltic constituents, some little coky carbon may develop at the point where the oil is vaporized, with a direct flooding feed of oil to the tube-retorts, but this does no harm as long as it does not extend to the portion of the tube which is hotter; the gasifying zone proper. A flooding feed of course keeps the portion of tube containing liquid oil at a temperature about the boiling point of such oil. Even at this, comparatively, low temperature an amount of, say, 2 per cent. "colloidal carbon" in the oil will tend to develop 6 to 8 per cent. coky carbon; apparently by catalytic action. With oils of this character and with a flooding feed, the heating should be so managed as to maintain the vaporizing zone distinct from the gasifying zone proper, the operation becomes irregular and must be stopped to remove such carbon. With carbon-containing or asphalt-containing oils it is often simpler to have a separate vaporizing device, giving a vapor feed in lieu of an oil feed to the gasifying tube-retorts.

In recovering the olefins, in lieu of chilling the gas it may be scrubbed with cold concentrated sulfuric acid which has little action upon the olefins proper. The acid solution upon dilution separates certain polymerized unsaturated aliphatics which may be used as raw material for the synthesis of caoutchouc. By chilling the gas to about —15° to —20° and then scrubbing the chilled gas with chilled heavy oil, the latter seems to take up some divinyl which may thus be recovered in a tolerably pure state, other unsaturated aliphatics having been separated by the chilling.

While the present invention in thermolytic treatment of hydrocarbons is more particularly concerned with the treatment of heavy oils, as such oils give better results for the manufacture of olefins and their derivatives, yet light oils, and condensable natural gases (containing groups with 5 to 8 carbons) may in some cases be treated by somewhat modifying the conditions. The absence of coky carbon in the heating zone is also highly important with these light oils and condensable gases.

Giving the tube retort a twist, or providing it with rifling grooves, to produce a swirling motion of the current of gases and vapors, is useful in preventing stratification.

What we claim is:

1. In the manufacture of unsaturated hydrocarbon gases, the process which comprises exposing hydrocarbon oil vapors for a brief period to a temperature approximating 700° C., and immediately removing the gas produced together with residual vapors of unchanged oil from the zone of heat so that the mixture is white and foggy, the time of exposure to the heat being such that while a large fraction of oil vapors is converted into permanent gas the remainder of said vapors shall comprise a substantial amount of easily condensable heavy oil, recoverable from the effluent mixture of gas and vapor, said heavy oil being adapted to produce oil vapors substantially like those from which the gas was produced.

2. In the manufacture of unsaturated hydrocarbon gases, the process which comprises feeding heavy hydrocarbon oil vapors through a tubing having one diameter of about one inch and a length not a very great many times as large, in such a manner that such vapors shall acquire at least an approximate temperature of 700° C. without reaching 800° C. at any point or time, and quickly cooling the effluent mixture of gas and vapors to stop the action, and condense and recover condensable oil, at the time of exposure of such vapors to heat, the temperature, and the speed of passage being so correlated that while a large fraction of the oil vapors are converted into permanent gas there shall remain a substantial amount of apparently unchanged oil recoverable from said effluent mixture, said oil making said mixture a white fog.

3. In the manufacture of unsaturated hydrocarbon gases, the process which comprises passing heavy hydrocarbon oil vapors through a tubing having one diameter of about one inch and a length not a very great many times as large, said tubing at a temperature approximating 700° C. but not able to heat any portion of said vapors to 800° C., the amount of vapors, the speed of passage, and the temperature attained being so correlated that while a large fraction of said vapors are converted into permanent gas, there shall remain a substantial amount of unchanged oil vapor persisting and making said mixture white and foggy, and quickly cooling the effluent mixture of vapor and gas to recover the heavy oil.

4. The process of making unsaturated hydrocarbon gases which comprises passing a current of vapors of high boiling petroleum for a very brief time to a temperature approximating 700° C., the period of exposure being sufficiently short to allow a substantial amount of such vapors to pass forward beyond the reaction zone in an unchanged state, so that the issuing mixture is white and foggy.

5. The process of making unsaturated hydrocarbon gases which comprises passing a current of vapors of high boiling petroleum through a tube having one cross sectional dimension of about an inch and a half and heated to a just visible red, the temperature of such tube, the heated length and the speed of the passage of the vapors being so correlated that a substantial amount of unchanged oil vapor emerges with the gasified products.

6. The process of making unsaturated hydrocarbon gases which comprises passing a current of vapors of high boiling petroleum through a short tube having one cross sectional dimension of about an inch and a half and heated to a temperature around 700° C., the heat, the length of heated zone and the speed of passage of such vapors being so correlated that at least 10 per cent. of the original amount of oil is recoverable beyond said heated zone as high boiling oil from the gasified product.

7. The process of making unsaturated hydrocarbon gases which comprises passing a current of petroleum vapors through a short tube having one cross sectional dimension of the order of magnitude of an inch and a half, the temperature, the heating conditions, and the speed of passage of such vapors being so correlated that while a major portion of the oil is cracked into permanent gases a minor fraction amounting to at least 10 per cent. shall go through unchanged and so that the effluent mixture of vapors and gases emerging from the tube shall be unstratified and have no brownish coloration.

8. The process of making unsaturated hydrocarbon gases which comprises exposing a mixture of vapors of high-boiling petroleum oil and of oil recovered from a similar prior treatment to a temperature high enough to convert a major portion to permanent gases while allowing a minor fraction of oil to persist unchanged, condensing out the unchanged oil for return to make the original mixture and collecting the permanent gases.

9. The process of preparing ethylene-rich gas which comprises passing heavy oil vapors quickly through a short length of heated tube having one cross sectional dimension of about an inch and a half at a temperature of about 700° C., the speed of passage, temperature and other conditions being so correlated that a substantial portion of unchanged heavy oil vapor emerges from the heated zone with the gas formed as an unstratified effluent mixture.

10. The process of preparing ethylene-rich gas which comprises exposing vapors of a petroleum material composed mainly of oils boiling above 150° to 200° C. for a short time to a temperature approximating 700° C. in the absence of coky carbon, the time of exposure to such heat being sufficiently short to insure the persistence of a substantial amount of the original oil vapors in the gas produced at the time of interrupting the heating so that the mixture of vapors and gas is white and foggy.

11. The process of preparing an ethylene-rich gas which comprises exposing vapors of a petroleum material composed mainly of oils boiling above 150° C. to 200° C. to a temperature approximating 700° C. in the absence of coky carbon for a time sufficient to convert a large fraction of said vapors into permanent gas while allowing a substantial amount of apparently unchanged oil vapors to persist in the mixture so that it appears white and foggy, and stopping the addition of outside heat when this point is reached.

12. The process of producing unsaturated hydrocarbons which comprises passing heavy hydrocarbon oil vapors through a heated tube having one diameter of about one inch at a rate sufficient to insure a substantial amount of heavy oil vapor passing beyond the heated zone with the production of saturated and unsaturated compounds, condensing out such heavy oil vapors and collecting selected unsaturated compounds approximately free from the saturated compounds.

13. The process of preparing unsaturated gaseous hydrocarbons which comprises transmitting hydrocarbon vapors through a tube heated to around 700° C. and free from coky carbon, the heated area, temperature and speed of transmission being so correlated as to insure a substantial proportion of said vapors passing ungasified beyond the heated zone so that the mixture is white and foggy.

14. In the gasification of hydrocarbon vapors, the process which comprises passing such vapors through a heated tube and producing a swirling motion of vapors and gases in such tube to prevent stratification.

15. The process of producing an unsaturated gas which comprises flowing hydrocarbon oil into a heated tube with a diameter of about one inch and a heat of about 700 C., the rate of flow and length of tube being so related that a substantial amount of easily condensable oil is recoverable from the effluent mixture, collecting said mixture at a point clear of the entering oil, and separating the oil and gas.

16. The process of producing an unsaturated gas which comprises flowing hydrocarbon oil from one end through a heated tube with a diameter of about one inch and a heat of about 700 C., the rate of flow and length of tube being so related that a substantial amount of easily condensable oil, is recoverable from the effluent mixture, collecting said mixture at the opposite end of said tube, and separating the oil and gas.

17. The process of producing an unsaturated gas which comprises flowing hydrocarbon oil into a tube with a diameter of about one inch, heating a part of said tube to a temperature in the neighborhood of but not much above 700° C., the rate of flow and length of tube being so related that a substantial amount of easily condensable oil is recoverable from the effluent mixture, collecting said mixture at a point clear of the entering oil, and separating the oil and gas.

18. The process of producing an unsaturated gas which comprises flowing hydrocarbon oil through a retort having one cross sectional dimension of about one inch and having a surface heated to a temperature in the neighborhood of but not much above 700° C., the rate of flow and length of heating being so related that a substantial amount of easily condensable oil is recoverable from the effluent mixture, and collecting said mixture at a point removed from where the oil strikes said surface.

19. The process of making an unsaturated gas which comprises flowing a stream of hydrocarbon oil into a tube of a diameter of about one inch, heating said tube so that a part of said oil is vaporized, further heating said oil as it passes along said tube to a temperature in the neighborhood of but not much above 700° C. continuing said heating long enough to convert part but not all of said oil into a permanent gas, collecting the issuing mixture while it still contains a substantial amount of apparently unchanged oil, and separating the product.

20. The process of making an unsaturated gas which comprises feeding hydrocarbon oil to a tube whose diameter is of about one inch, heating a part at least of said tube to the neighborhood of but not much above 700° C., collecting the issuing mixture while it still contains a substantial amount of easily condensable oil, and maintaining the flow of oil through the tube at such a rate that the issuing gas is free from color due to tar.

21. The process of producing an unsaturated gas which comprises flowing hydrocarbon oil through a retort having one cross sectional dimension of about one inch and having a surface heated to a temperature in the neighborhood of but not much above 700° C. and maintaining such a rate of flow and length of heating that a substantial amount of easily condensable oil is recoverable from the effluent mixture and that the gas is free from color due to tar.

22. The process of producing substantially pure unsaturated gases, which comprises passing hydrocarbon oil vapors through a tube whose diameter is of about one inch, heating said tube to a temperature in the neighborhood of but not much above 700° C., removing the mixture from the heat while there is still a substantial amount of easily condensable oil present, condensing out such condensable oil, and collecting selected unsaturated gases approximately free from the unsaturated gases.

23. The process of cracking hydrocarbon oil which comprises flowing the oil over a heated surface, maintaining the rate of flow and heat of the surface at such a proportion that part of the oil passes over apparently unchanged and that the produced mixed vapor of oil and gas has the whitish foggy appearance characteristic of the absence of tar, and separating the apparently unchanged oil from the cracked product.

24. The continuous process of cracking hydrocarbon oil which comprises flowing the oil over a heated surface, maintaining the rate of flow and heat of the surface at such a proportion that a substantial part of the oil passes over and is condensable apparently unchanged, but is sufficient to crack a substantial part of the oil so that the issuing mixture has the characteristic whitish foggy appearance due to the presence of oil vapor and the absence of tar, separating the apparently unchanged oil from the cracked product and returning said separated oil to be flowed over said surface.

25. The process of cracking hydrocarbon oil which comprises flowing the oil through a heated tube having a diameter of about one inch, flowing the oil through said tube at such a rate that a substantial part of the oil issues as vapor but apparently unchanged, maintaining the heat at such a point that a substantial part of the oil is cracked but that the issuing mixture has the characteristic whitish rather than brown color due to the absence of tar and the presence of such vapor, and separating the apparently unchanged oil from the cracked product.

26. The process of cracking hydrocarbon oil which comprises flowing the oil through a narrow tube having a vaporizing section and a cracking section, maintaining the heat of the tube and the length of said sections such that a considerable part of the oil is cracked in the cracking section and a considerable part is passed through apparently as unchanged vapor so that the issuing product has the characteristic whitish rather than brown color due to the presence of such vapor and the absence of tar, and separating the apparently unchanged oil from the cracked product.

27. The continuous process of cracking hydrocarbon oil which comprises flowing the oil through a narrow tube open at both ends, maintaining the rate of flow and heating a section of the tube at such a proportion that much of the oil is cracked but a considerable portion is apparently unchanged vapor in said section, so that the issuing mixture has the characteristic whitish rather than brown appearance due to the presence of such vapor and the absence of tar, and separating the apparently unchanged oil from the cracked product.

In testimony whereof, we affix our signatures in the presence of two subscribing witnesses.

BYRON E. ELDRED.
GAIL MERSEREAU.

Witnesses:
JOHN A. RILEY,
FRANK B. FRY.